United States Patent
Kuboki et al.

(10) Patent No.: US 9,954,261 B2
(45) Date of Patent: Apr. 24, 2018

(54) AIR BATTERY

(75) Inventors: Takashi Kuboki, Tokyo (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 13/455,202

(22) Filed: Apr. 25, 2012

(65) Prior Publication Data

US 2012/0208096 A1    Aug. 16, 2012

Related U.S. Application Data

(63) Continuation of application No. PCT/JP2010/060869, filed on Jun. 25, 2010.

(51) Int. Cl.
| | |
|---|---|
| *H01M 8/22* | (2006.01) |
| *H01M 4/485* | (2010.01) |
| *H01M 12/08* | (2006.01) |
| *H01M 4/38* | (2006.01) |

(52) U.S. Cl.
CPC ........... *H01M 12/08* (2013.01); *H01M 4/382* (2013.01); *Y02E 60/128* (2013.01)

(58) Field of Classification Search
CPC ............................. H01M 12/08; H01M 4/382
USPC .................... 429/144, 246, 27, 29, 322, 194
See application file for complete search history.

(56) References Cited

U.S. PATENT DOCUMENTS

| | | | | |
|---|---|---|---|---|
| 5,827,602 | A * | 10/1998 | Koch et al. ................... | 429/328 |
| 7,145,038 | B1 | 12/2006 | Hobbs | |
| 2004/0241537 | A1 * | 12/2004 | Okuyama et al. .............. | 429/86 |
| 2006/0078790 | A1 * | 4/2006 | Nimon et al. ................. | 429/137 |
| 2007/0117007 | A1 * | 5/2007 | Visco .................. | H01M 2/1646 429/144 |
| 2008/0070087 | A1 * | 3/2008 | Johnson .......................... | 429/33 |
| 2009/0317724 | A1 | 12/2009 | Kumar et al. | |
| 2010/0151336 | A1 * | 6/2010 | Nakanishi ............... | H01M 6/14 429/407 |
| 2011/0200891 | A1 * | 8/2011 | Kotani .................. | H01M 4/382 429/403 |

(Continued)

FOREIGN PATENT DOCUMENTS

| | | | |
|---|---|---|---|
| JP | 58-48369 | A | 3/1983 |
| JP | 10-83836 | A | 3/1998 |

(Continued)

OTHER PUBLICATIONS

Kuboki et al., "Lithium-air batteries using hydrophobic room temperature ionic liquid electrolyte", Journal of Power Sources, 146, May 31, 2005, pp. 766-769.*

(Continued)

*Primary Examiner* — Osei K Amponsah
(74) *Attorney, Agent, or Firm* — Oblon, McClelland, Maier & Neustadt, L.L.P.

(57) ABSTRACT

According to one embodiment, an air battery includes a case, a positive electrode, a negative electrode, a first nonaqueous electrolyte, a second nonaqueous electrolyte, a solid electrolyte layer and a hole. The first nonaqueous electrolyte is permeated into the positive electrode and includes an ionic liquid. The second nonaqueous electrolyte is permeated into the negative electrode and includes an organic solvent. The solid electrolyte layer is provided between the positive electrode and the negative electrode and has lithium ion conductivity.

17 Claims, 1 Drawing Sheet

(56) References Cited

U.S. PATENT DOCUMENTS

2011/0305974 A1* 12/2011 Nakanishi .................... 429/521

FOREIGN PATENT DOCUMENTS

| JP | 2002-15737 | A | | 1/2002 | | |
|----|------------|---|---|--------|---|---|
| JP | 2002-15782 | A | | 1/2002 | | |
| JP | 2002-298934 | A | | 10/2002 | | |
| JP | 2003-7357 | A | | 1/2003 | | |
| JP | 2003-17143 | A | | 1/2003 | | |
| JP | 2003-17144 | A | | 1/2003 | | |
| JP | 2003-100309 | | * | 4/2003 | ............. | H01M 4/96 |
| JP | 2003-100309 | A | | 4/2003 | | |
| JP | 2004-63262 | A | | 2/2004 | | |
| JP | 2004-119278 | A | | 4/2004 | | |
| JP | 4015916 | | | 9/2007 | | |
| JP | 2009-230981 | A | | 10/2009 | | |
| JP | 2010-129495 | | | 6/2010 | | |
| JP | 2010-176941 | | | 8/2010 | | |

OTHER PUBLICATIONS

International Search Report dated Sep. 28, 2010 in PCT/JP2010/060869 filed Jun. 25, 2010.
J. Read; "Characterization of the Lithium/Oxygen Organic Electrolyte Battery"; Journal of The Electrochemical Society, 2002, vol. 149, No. 9, pp. A1190-A1195.
Hao-shen Zhou; "Post lithium ion battery—the development of new lithium air battery"; AT International. 2009, pp. A1-3-1-A1-3-13.
Keith E. Johnson, "What's an Ionic Liquid?", *The Electrochemical Society Interface*, pp. 38-41 (Spring 2007).
Super Solvents, *Technology Ireland*, (Sep. 1999).
Guest Editorial, "Ionic Liquids," *Accounts of Chemical Research*, vol. 40, No. 11, pp. 1077-1078 (2007).
Ionic Liquids, *The Quill Research Centre*, (http://quill.qub.ac.uk/attachments/What_are_ILs_and_what_can_they_do.pdf).
Office Action dated Jan. 20, 2015 in Japanese Patent Application No. 2013-264355 (with English language translation).
Office Action in corresponding Chinese Application No. 201510249641.5, dated Sep. 2, 2016. (w/English Translation).

\* cited by examiner

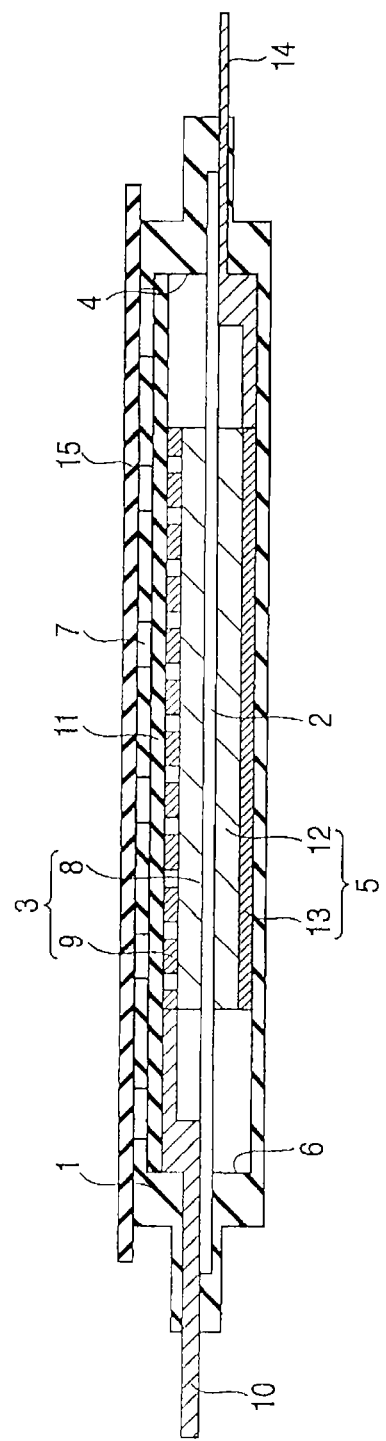

AIR BATTERY

CROSS REFERENCE TO RELATED APPLICATIONS

This application is a Continuation Application of PCT Application No. PCT/JP2010/060869, filed Jun. 25, 2010, the entire contents of which are incorporated herein by reference.

FIELD

Embodiments described herein relate generally to an air battery.

BACKGROUND

Recently, the market of portable information apparatuses such as a portable telephone and an electronic mail terminal has been rapidly expanding. With progress in the miniaturization and in the weight reduction of these portable information apparatuses, the power source of the apparatus is also required to be miniaturized and to be made lighter in weight. A lithium ion secondary battery having a high energy density is used for these portable information apparatuses. Further, there is a need for a battery capable of providing higher capacity.

As for an air battery using oxygen in the air as a positive electrode active material, it is not necessary to integrate the positive electrode active material in the battery. Thus, a higher capacity can be expected. A lithium/oxygen organic electrolyte battery is described in Non Patent Literature 1. The lithium/oxygen organic electrolyte battery comprises a positive electrode containing $MnO_2$ and carbon black, a negative electrode formed of lithium, a separator disposed between the positive electrode and the negative electrode, and a nonaqueous electrolyte which is immersed in the positive electrode, the negative electrode and the separator.

Patent Literature 1 suggests that a hydrophobic ionic liquid is used as a nonaqueous electrolyte of a nonaqueous electrolyte air battery. Patent Literature 2 suggests that a solid electrolyte is applied to the nonaqueous electrolyte of the nonaqueous electrolyte air battery.

On the other hand, Non Patent Literature 2 points out a problem that, according to a lithium air battery using an organic electrolyte, the accumulation of $Li_2O$ (a solid reaction product) at the positive electrode results in blocking of the pores of the positive electrode, and thus the discharge reaction is terminated. In order to avoid this problem, in the air battery of Non Patent Literature 2, it is suggested that the solid electrolyte is arranged as the separator between the positive electrode and the negative electrode, and the organic electrolyte is used for the negative electrode, and a water-based electrolyte is used for the positive electrode.

CITATION LIST

Patent Literature

Patent Literature 1: Japanese Patent No. 4015916
Patent Literature 2: U.S. Patent Application Publication No. 2009/317724

Non Patent Literature

Non Patent Literature: 1 Journal of The Electrochemical Society, 149(9) A1190-A1195 (Jul. 29, 2002)

Non Patent Literature 2: National Institute of Advanced Industrial Science and Technology, "Post lithium ion battery and development of a new type lithium-air battery", Jul. 15, 2009, AT International 2009 Forum (hosted by Nikkei Automotive Technology and Nikkei electronics, Venue: Pacifico Yokohama Annex Hall)

BRIEF DESCRIPTION OF THE DRAWINGS

The single FIGURE is a cross-sectional view in which an air battery of an embodiment is cut along the thickness direction.

DETAILED DESCRIPTION

In general, according to one embodiment, an air battery includes a case, a positive electrode provided in the case, a negative electrode provided in the case, a first nonaqueous electrolyte, a second nonaqueous electrolyte, a solid electrolyte layer and a hole. The first nonaqueous electrolyte is permeated into the positive electrode and includes an ionic liquid. The second nonaqueous electrolyte is permeated into the negative electrode and includes an organic solvent. The solid electrolyte layer is provided between the positive electrode and the negative electrode and has lithium ion conductivity. The hole is provided in the case and supplies oxygen to the positive electrode.

The problems of Patent Literatures 1 and 2 as well as Non Patent Literatures 1 and 2 are as follows.

Like Non Patent Literature 1, the air battery formed by using a nonaqueous electrolyte containing an organic solvent as the nonaqueous electrolyte is largely affected by the environmental temperature and humidity in a used state, namely, a state where the air holes for supplying oxygen to the positive electrode are opened. In the high temperature conditions, the organic solvent is volatilized from air holes, and thus the amount of the electrolyte is decreased.

Consequently, the battery life is shortened. In the high humidity conditions, water is entered from the air holes and the negative electrode is deteriorated. Consequently, the battery life is shortened.

Like Patent Literature 1, when the ionic liquid is used for the nonaqueous electrolyte, the ionic liquid comes in contact with the negative electrode. Thus, the ionic liquid needs to have excellent reduction-resistant properties. An ionic liquid containing ammonium cations, which is known as the ionic liquid having excellent reduction-resistant properties, has a viscosity higher than that of an ionic liquid containing imidazolium cations with poor reduction-resistant properties. Thus, when the ionic liquid containing ammonium cations is used for the nonaqueous electrolyte, the lithium ion conductivity is poor. This results in reduction in large-current-discharging characteristics.

When the solid electrolyte described in Patent Literature 2 is used for the nonaqueous electrolyte, the electric current value is decreased. In the nonaqueous electrolyte air battery, it is necessary that dissolution of oxygen in the electrolyte and a reaction of lithium ions on the surface of the electrode are continuously occurred in the vicinity of the positive electrode during discharge. When the solid electrolyte is used as the nonaqueous electrolyte, the dissolution of oxygen in the electrolyte is slow. Thus, a sufficient electric current value cannot be obtained.

The reaction Chemical formula at the time of discharge of the air battery of Non Patent Literature 2 is shown in Chemical formula 1.

[Chemical formula 1]

Positive electrode $1/2O_2 + H_2O + 2e^- \rightarrow 2OH^{31}$

Negative electrode $2Li \rightarrow 2Li^+ + 2e^-$

All reactions $2Li + 1/2O_2 + H_2O \rightarrow 2LiOH\downarrow$

When the water-based electrolyte is used for the positive electrode side, the reaction product during discharge at the positive electrode is an OH-ion as shown in Chemical formula 1. The discharge reaction is controlled by the negative electrode capacity and the water volume and is not dependent on the positive electrode. However, the water in the electrolyte at the positive electrode is consumed during the discharge reaction. The amount of the electrolyte is decreased with the proceeding of the discharge reaction. Thus, the electrolyte tends to be depleted and a long life cannot be obtained. If the amount of the electrolyte is increased to improve the life-time, the volume energy density is decreased. Further, like Non Patent Literature 2, if the water-based electrolyte is used for the positive electrode side, it is impossible to charge the battery. This is because the lithium which is transferred to the positive electrode during discharge, is irreversibly precipitated in the water-based electrolyte as lithium hydroxide.

In the air battery of the embodiment, a first nonaqueous electrolyte containing an ionic liquid is penetrated to the positive electrode and a second nonaqueous electrolyte containing an organic solvent is penetrated to the negative electrode. A solid electrolyte layer is arranged between the positive and negative electrodes. The solid electrolyte layer contains a material having lithium ion conductivity and is not dissolved and swollen in the first nonaqueous electrolyte and the second nonaqueous electrolyte. When the solid electrolyte layer is not dissolved in the ions and the organic solvent, it is possible to avoid the formation of through holes through which the ionic liquid in the first nonaqueous electrolyte and the organic solvent in the second nonaqueous electrolyte are passed in the solid electrolyte layer. Therefore, the second nonaqueous electrolyte at the negative electrode side is not transferred to the positive electrode side, thereby preventing the second nonaqueous electrolyte from being volatilized from the holes. Further, the first nonaqueous electrolyte at the positive electrode is not transferred to the negative electrode side, thereby preventing the first nonaqueous electrolyte from being reduced and decomposed. When the solid electrolyte layer is not swelled in the first nonaqueous electrolyte and the second nonaqueous electrolyte, it is possible to avoid the possibility that the concentration of the material having lithium ion conductivity in the solid electrolyte layer is decreased by the entry of the ionic liquid and the organic solvent into the solid electrolyte layer, the lithium ion conductivity is reduced with the result, and discharge characteristics are lowered.

Here, the term "material having lithium ion conductivity" means a material capable of transferring lithium ions according to the voltage difference or the concentration gradient. The term "the solid electrolyte layer is not dissolved in the first nonaqueous electrolyte and the second nonaqueous electrolyte" means that the weight of the solid electrolyte layer is not decreased when the solid electrolyte layer is immersed in the first nonaqueous electrolyte or second nonaqueous electrolyte. Specifically, the solid electrolyte layer is immersed in the first nonaqueous electrolyte or second nonaqueous electrolyte in a low humidity and inert gas atmosphere, heated at 45° C. for 24 hours, washed with ethylmethyl carbonate, and dried at a room temperature. Then, when the weight loss of the solid electrolyte layer is 3% or less, this is confirmed to be undissolved.

The term "the solid electrolyte layer is not swollen in the first nonaqueous electrolyte and the second nonaqueous electrolyte" means that when the solid electrolyte layer is immersed in the first nonaqueous electrolyte or second nonaqueous electrolyte, molecules constituting the first nonaqueous electrolyte and the second nonaqueous electrolyte are not incorporated into the solid electrolyte layer. Specifically, the solid electrolyte layer is immersed in the first nonaqueous electrolyte or second nonaqueous electrolyte in a low humidity and inert gas atmosphere, left alone at 45° C. for 24 hours, washed with ethylmethyl carbonate, and dried at a room temperature. Then, when the gain of weight of the solid electrolyte layer is 3% or less, this is confirmed to be not swollen.

Since the ionic liquid to be used for the first nonaqueous electrolyte is nonvolatile, it is possible to prevent the liquid from being volatilized from the holes for supplying oxygen to the positive electrode. The first nonaqueous electrolyte is sealed by the solid electrolyte layer and does not reach the negative electrode. Thus, the ionic liquid is neither reduced nor decomposed by the negative electrode.

When a solvent excellent in reduction-resistant properties is selected as the organic solvent to be used for the second nonaqueous electrolyte, the reduction decomposition on the negative electrode can be suppressed. The second nonaqueous electrolyte is sealed by the solid electrolyte layer and does not reach the positive electrode. Thus, the organic solvent is not volatilized from the holes.

Since the solid electrolyte layer is nonporous as described above, it is possible to prevent the mixing of the first nonaqueous electrolyte and the second nonaqueous electrolyte. Since the solid electrolyte layer does not permeate moisture, it is possible to suppress the deterioration of the negative electrode by moisture.

Therefore, since the first nonaqueous electrolyte is not in contact with the negative electrode, it is possible to use the ionic liquid which is poor in reduction-resistant properties, but excellent in lithium ion conductivity. As compared with the case where the ionic liquid is used for the nonaqueous electrolyte, high current charge-and-discharge characteristics are improved. Since the second nonaqueous electrolyte does not reach the holes, the organic solvent contained in the second nonaqueous electrolyte is not volatilized from the holes. As compared with the case where the organic solvent is used for the nonaqueous electrolyte, the durability is improved. As a result, performance of positive and negative electrodes is improved. Thus, the reversibility of $Li_2O$ produced at the positive electrode is improved and the durability and high current charge-and-discharge characteristics can be improved. Accordingly, there can be provided an air battery which is excellent in durability, can be charged, and has improved high current charge and discharge characteristics.

Hereinafter, the first nonaqueous electrolyte, second nonaqueous electrolyte, solid electrolyte layer, positive electrode, negative electrode, and case will be described.

The first nonaqueous electrolyte contains an ionic liquid and can contain a supporting electrolyte to be dissolved in the ionic liquid, if necessary. The ionic liquid has cations with positive charge and anions with a negative charge and is nonvolatile. Therefore, when the ionic liquid is used for the first nonaqueous electrolyte, the volatilization volume of the nonaqueous electrolyte from the pores can be reduced.

Further, when a hydrophobic ionic liquid is selected, the entrance of the moisture from the pores can be suppressed.

Thus, when the hydrophobic ionic liquid is used, the lifetime of the air battery can be further improved.

The ionic liquid which is suitable for a base potential negative electrode and is excellent in reduction-resistant properties has a high viscosity in many cases. On the other hand, the ionic liquid having a low viscosity tends to be poor in reduction-resistant properties. Thus, when using the ionic liquid as a nonaqueous electrolyte of a power source for vehicles such as electric vehicles, hybrid vehicles, and plug-in hybrid vehicles, which requires more than 10 years lifetime, if the ionic liquid is in contact with the negative electrode, the ionic liquid may be gradually reduced and decomposed. According to the air battery of the embodiment, there are few possibilities that the ionic liquid is in contact with the negative electrode. Thus, it is possible to use a low viscosity ionic liquid. In the case of the low viscosity ionic liquid, large current discharging characteristics of the air battery can be further improved.

Examples of the cations include one or more selected from the group consisting of ammonium ion, imidazolium ion, phosphonium ion, and cations obtained by introducing a substituent to the ions (ammonium ion, imidazolium ion, and phosphonium ion).

The ammonium ion can have a structural formula represented, for example, by Chemical formula 2.

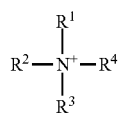

[Chemical formula 2]

$R^1$, $R^2$, $R^3$, and $R^4$ may be a substituent selected from the group consisting of a hydrocarbon group, an ester group, an ether group, and a nitrile group and may be the same or a different substituent. The number of carbon atoms contained in the substituent is preferably 8 or less. Thus, viscosity increase by an increase in the molecular weight of the ionic liquid is suppressed and the lithium ion conductivity of the first nonaqueous electrolyte can be improved. Among the substituents, the hydrocarbon group and ether group are preferred. Since the hydrocarbon group has a weak intermolecular interaction as compared with other substituents, the viscosity of the ionic liquid can be reduced. Examples of the hydrocarbon group include an alkyl group, a phenyl group, and a benzyl group. Among them, the alkyl group has a flexible molecular structure and it is preferred to achieve the low viscosity of the ionic liquid. In the case of the alkyl and ether groups, the number of carbon atoms is preferably from 1 to 4. At least one substituent of $R^1$, $R^2$, $R^3$, and $R^4$ has preferably 1 carbon atom, and is preferably a methyl group. When at least one substituent is a methyl group, a lower viscosity of the ionic liquid is achieved. The substituents $R^1$, $R^2$, $R^3$, and $R^4$ may be bound to one another.

Examples of the ammonium ion shown in Chemical formula 2 include N-butyl-N,N,N-trimethylammonium ion, N-ethyl-N,N-dimethyl-N-propylammonium ion, N-butyl-N-ethyl-N,N-dimethylammonium ion, N-butyl-N,N-dimethyl-N-propylammonium ion, N-propyl-N-methylpyrrolidinium ion, and N-butyl-N-methylpyrrolidinium ion, however they are not limited thereto.

As the imidazolium ion, for example, one represented by the structural formula shown in Chemical formula 3 can be used.

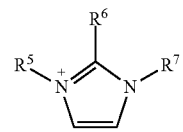

[Chemical formula 3]

$R^5$, $R^6$, and $R^7$ may be a substituent selected from the group consisting of a hydrocarbon group, an ester group, an ether group, and a nitrile group and may be the same or a different substituent. The number of carbon atoms contained in the substituent is preferably 8 or less. Thus, viscosity increase by an increase in the molecular weight of the ionic liquid is suppressed and the lithium ion conductivity of the first nonaqueous electrolyte can be improved. Among the substituents, the hydrocarbon group is preferred. Since the hydrocarbon group has a weak intermolecular interaction as compared with other substituents, the viscosity of the ionic liquid can be reduced. Examples of the hydrocarbon group include an alkyl group, a phenyl group, and a benzyl group. Among them, the alkyl group has a flexible molecular structure and it is preferred to achieve the low viscosity of the ionic liquid. In the case of the alkyl group, a more preferred range of the number of carbon atoms in $R^5$ and $R^7$ is 1 to 5, and the range in $R^6$ is 0 to 2. When the number of carbon atoms in $R^6$ is 0, this means hydrogen. It is preferable that the substituents $R^5$ and $R^7$ are different. If the structures of $R^5$ and $R^7$ are different, the molecular symmetry becomes lower, a lower viscosity of the ionic liquid is achieved. It is more preferable that at least one of $R^5$ and $R^7$ has 1 carbon atom, and is a methyl group.

Specific examples of the imidazolium ion shown in Chemical formula 3 include 1-ethyl-3-methylimidazolium ion, 1-butyl-3-methylmidazolium ion, 1-ethyl-2,3-dimethylimidazolium ion, and 1-ethyl-3,4-dimethylimidazolium ion, however they are not limited thereto.

The phosphonium ion can have a structural formula represented, for example, by Chemical formula 4.

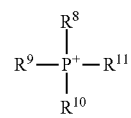

[Chemical formula 4]

$R^8$, $R^9$, $R^{10}$, and $R^{11}$ may be a substituent selected from the group consisting of a hydrocarbon group, an ester group, and an ether group and may be the same or a different substituent. In each case, the number of carbon atoms contained in the substituent is preferably 8 or less. Among the substituents, the hydrocarbon group and ether group are preferred. Examples of the hydrocarbon group include an alkyl group, a phenyl group, and a benzyl group. Among them, the alkyl group has a flexible molecular structure and it is preferred to achieve the low viscosity of the ionic liquid. In the case of the alkyl group, a more preferred range of the number of carbon atoms is 1 to 4. The substituents $R^8$, $R^9$, $R^{10}$, and $R^{11}$ may be bound to one another.

Specific examples of the phosphonium ion shown in Chemical formula 4 include tributyl(2-methoxyethyl)phosphonium ion and tributylmethylphosphonium ion, however they are not limited thereto.

Examples of the anions include one or more selected from the group consisting of $PF_6^-$, $BF_4^-$, $CF_3SO_3^-$, $C_4F_9SO_3^-$, $[B(OOC-COO)_2]^-$, $[(CN)_2N]^-$, $[(CF_3SO_2)_2N]^-$, $[(C_2F_5SO_2)_2N]^-$, $BF_3(CF_3)^-$, and anions obtained by introducing a substituent to the ions ($PF_6^-$, $BF_4^-$, $CF_3SO_3^-$, $C_4F_9SO_3^-$, $[B(OOC-COO)_2]^-$, $[(CN)_2N]^-$, $[(CF_3SO_2)_2N]^-$, $[(C_2F_5SO_2)_2N]$, and $BF_3(CF_3)^-$). When $BF_3(CF_3)^-$, $[(CF_3SO_2)_2N]^-$ having a sulfonylimide structure or $[(C_2F_5SO_2)_2N]^-$ is used as the anion, the ionic liquid becomes hydrophobic. Thus, this is more preferred. Particularly, $[(CF_3SO_2)_2N]^-$ is preferred and thus a lower viscosity of the ionic liquid can be achieved.

The supporting electrolyte is not particularly limited as long as it can be used for lithium-ion secondary batteries. Examples thereof include $LiPF_6$, $LiBF_4$, $Li(CF_3SO_3)$, $Li(C_4F_9SO_3)$, $Li[B(OOC-COO)_2]$, $Li[(CN)_2N]$, $Li[(CF_3SO_2)_2N]$, $Li[(C_2F_5SO_2)_2N]$, and compounds obtained by introducing a substituent to the compounds ($LiPF_6$, $LiBF_4$, $Li(CF_3SO_3)$, $Li(C_4F_9SO_3)$, $Li[B(OOC-COO)_2]$, $Li\{(CN)_2N\}$, $Li[(CF_3SO_2)_2N]$, and $Li[(C_2F_5SO_2)_2N]$). The type of the supporting electrolyte to be used may be one or two or more.

The anion constituting the ionic liquid may be the same as or different from the anion constituting the supporting electrolyte. Among them, the anion of the ionic liquid and the anion of the supporting electrolyte are preferably anions obtained by substituting a part of fluorine atom of $PF_6^-$, $BF_4^-$ or an anion having a sulfonylimide group by a fluoro alkyl group. Particularly, it is preferable that both of the ionic liquid and the supporting electrolyte contain $BF_3(CF_3)^-$ or $[(CF_3SO_2)_2N]^-$ as the anion.

It is desirable that the concentration of the supporting electrolyte is set to 0.1 to 4 mol/L. The ionic conductivity of the first nonaqueous electrolyte can be improved by setting the concentration of the supporting electrolyte to 0.1 mol/L or more. Thus, high discharge characteristics are obtained. Further, an increase in the viscosity of the first nonaqueous electrolyte can be suppressed by setting the concentration of the supporting electrolyte to 4 mol/L or less. Thus, the ionic conductivity of the first nonaqueous electrolyte can be improved. The concentration is more preferably from 0.3 to 2 mol/L.

The second nonaqueous electrolyte can contain an organic solvent and a supporting electrolyte to be dissolved in the organic solvent. The second nonaqueous electrolyte is not particularly limited as long as it can be used for lithium-ion secondary batteries.

It is desirable that the organic solvent contains one or more selected from the group consisting of esters, ester carbonates, ethers, nitriles, and compounds obtained by introducing a substituent to the compounds (esters, ester carbonates, ethers, and nitrites). Solvents selected from esters and ester carbonates are preferred. Among esters, esters having a cyclic structure are preferred, particularly the five-membered ring of γ-butyrolactone (γBL) is preferred.

As for ester carbonates, both cyclic and linear structures can be used. As cyclic ester carbonates, ester carbonates with a five-membered ring structure are preferred. Particularly, ethylene carbonate (EC), vinylene carbonate (VC), and propylene carbonate (PC) are preferred. As linear ester carbonates, ester carbonates having 7 or less carbon atoms are preferred. Particularly, dimethyl carbonate (DMC), diethyl carbonate (DEC), and ethylmethyl carbonate (EMC) are preferred.

As for ethers, both cyclic and linear structures can be used. As cyclic ethers, ethers with a five- or six-membered ring structure are preferred. Among them, ethers having no double bond are preferred. As linear ethers, ethers containing 5 or more carbon atoms are preferred. Examples thereof include tetrahydropyran, dioxane, tetrahydrofuran, 2-methyltetrahydrofuran, butyl ether, and isopentyl ether.

Examples of the nitrile include acetonitrile and propionitrile.

The organic solvents may be used alone. A plurality of the solvents may be mixed for use. It is preferable to contain ester carbonates. Among them, it is preferable to contain ester carbonates having a five-membered ring structure. It is preferable to contain EC or PC.

Examples of the preferable composition of the organic solvent include EC/PC, EC/γBL, EC/EMC, EC/PC/EMC, EC/EMC/DEC, and EC/PC/γBL.

The supporting electrolyte is not particularly limited as long as it can be used for lithium-ion secondary batteries. For example, the same types as those described in the section of the first nonaqueous electrolyte can be used. Particularly, $LiPF_6$, $LiBF_4$, $Li(CF_3SO_3)$, and $Li[(CF_3SO_2)_2N]$ are preferred.

The solid electrolyte layer contains a material having lithium ion conductivity which is not dissolved and swollen in the first nonaqueous electrolyte and the second nonaqueous electrolyte. It is desirable that the solid electrolyte layer is nonporous and selectively transmits lithium ions.

The material having lithium ion conductivity is preferably one or more selected from the group consisting of an organic polymer, an oxide, and a sulfide. Since those materials exhibit lithium ion conductivity in a solid state, the solid electrolyte layer which is nonporous and selectively transmits lithium ions can be realized.

The organic polymer is used with the supporting electrolyte. Specific examples of the organic polymer include a polyethylene oxide containing-polymer and a polyvinyl-containing polymer. The polyethylene oxide containing-polymer may contain polyethylene oxide as a main chain and a part thereof may be branched. At the end of the polyethylene oxide, the hydroxyl group is preferably protected by ether or an ester bond. It is preferable that the polyvinyl-containing polymer contains a polyvinyl chain as a main chain and contains a functional group having an ester bond or an ester carbonate bond in a side chain branched from the main chain. Particularly, the polyethylene oxide containing- polymer is desired because of excellent hopping conductivity in lithium ions. The organic polymer may contain a small amount of softening agents such as dibutyl phthalate.

The supporting electrolyte to be used with the organic polymer is not particularly limited as long as it can be used for lithium-ion secondary batteries. For example, the same types as those described in the section of the first nonaqueous electrolyte can be used. Particularly preferable examples thereof include $LiPF_6$, $LiBF_4$, $Li(CF_3SO_3)$, $Li[(CF_3SO_2)_2N]$, and lithium salts obtained by introducing a substituent to the compounds.

Examples of the oxide include oxide glasses and oxide crystals. Those oxides contain lithium as a constituent element and do not need the supporting electrolyte unlike in the case of the solid electrolyte layer containing an organic polymer. Examples of the oxide glasses include oxides including one or more elements selected from the group consisting of B, Si, and P and Li. Specific examples thereof include $Li_4SiO_4$—$Li_3BO_3$ system oxide. Examples of the oxide crystals include oxides including one or more elements selected from the group consisting of Al, Ti, P, La, N, Si, In, and Nb and Li. Specific examples thereof include $Na_3Zr_2Si_2PO_{12}$, $LiTi(PO_4)_3$, $LiAlTi(PO_4)_3$, $Li_7La_3Zr_2O_{12}$, and $La_{0.5}Li_{0.5}TiO_3$.

Examples of the sulfide include sulfide glasses and sulfide crystals. Those oxides contain lithium as a constituent element and do not need the supporting electrolyte unlike in the case of the solid electrolyte layer containing an organic polymer. Specific examples thereof include $Li_3PS_4$, $Li_4SiS_4$, $LiGeS_4$—$Li_3PS_4$, and $Li_2S$—$SiS_2$ systems, $SiS_2$—$P_2S_5$ system, $Li_2S$—$B_2S_3$ system, and $Li_2S$—$SiS_2$—$Li_4SiO_4$ system. Among them, $Li_2S$—$P_2S_5$ and $Li_{3.25}Ge_{0.25}P_{0.75}S_4$ are preferred because of high electrical conductivity.

When the oxide and/or sulfide included in the solid electrolyte layer are poor in reduction-resistant properties, it is preferable that a porous film, a nonwoven fabric or a metal oxide layer is arranged between the solid electrolyte layer and the negative electrode. When the porous film, the nonwoven fabric or the metal oxide layer is arranged between the solid electrolyte layer and the negative electrode, the solid electrolyte layer does not come in contact with the negative electrode. Thus, reductive decomposition of the oxide and/or sulfide included in the solid electrolyte layer by the contact with the negative electrode as well as deterioration of the solid electrolyte layer can be avoided. As the porous film or the nonwoven fabric, one which can be used as a separator for lithium-ion secondary batteries, such as a polyethylene porous film, a polypropylene (PP) porous film, and a cellulosic nonwoven fabric can be used. The metal oxide layer is not particularly limited as long as it is a metal oxide which is insoluble in the nonaqueous electrolyte at the negative electrode side, such as aluminium oxide, silicon oxide or zinc oxide. When the oxide and/or sulfide included in the solid electrolyte layer are excellent in reduction-resistant properties, volume energy density can be improved. Thus, it is preferable not to use the porous membrane, the nonwoven fabric or the metal oxide layer.

Preferable combinations of the first nonaqueous electrolyte, the second nonaqueous electrolyte, and the solid electrolyte layer are as follows.

When the solid electrolyte layer contains the organic polymer, the supporting electrolytes included in the first nonaqueous electrolyte, the second nonaqueous electrolyte, and the solid electrolyte layer are preferably the same. Among them, the compound obtained by substituting a part of fluorine atom of $LiPF_6$, $LiBF_4$ or a lithium salt having an anion with a sulfonylimide group by a fluoro alkyl group is preferred. Particularly, $Li[(CF_3SO_2)_2N]$ is preferred. A part of the supporting electrolyte included in the solid electrolyte layer containing an organic polymer may be exchanged with the supporting electrolyte in the first nonaqueous electrolyte or the second nonaqueous electrolyte. Accordingly, changes in battery characteristics can be suppressed by making the supporting electrolytes included in the first nonaqueous electrolyte, the second nonaqueous electrolyte, and the solid electrolyte layer the same electrolytes. It is preferable that the first nonaqueous electrolyte is hydrophobic. Thus, the first nonaqueous electrolyte contains preferably an anion obtained by substituting a part of fluorine element of $PF_6^-$, $BF_4^-$ or an anion having a sulfonylimide group by a fluoro alkyl group. Particularly, $[(CF_3SO_2)_2N]^-$ having excellent water resistance is preferred.

As the anion to be used for the ionic liquid of the first nonaqueous electrolyte, $[(CF_3SO_2)_2N]^-$ is preferred as described above. Preferable examples of the cations include N-butyl-N,N,N-trimethylammonium ion, N-ethyl-N,N-dimethyl-N-propylammonium ion, N-butyl-N-ethyl-N,N-dimethylammonium ion, N-butyl-N,N-dimethyl-N-propylammonium ion, N-propyl-N-methylpyrrolidinium ion, N-butyl-N-methylpyrrolidinium ion, 1-ethyl-3-methylimidazolium ion, 1-butyl-3-methylimidazolium ion, 1-ethyl-2,3-dimethylimidazolium ion, and 1-ethyl-3,4-dimethylimidazolium ion. Particularly, N-propyl-N-methylpyrrolidinium ion, N-butyl-N-methylpyrrolidinium ion, and 1-ethyl-3-methylimidazolium ion are preferred. The most preferred one is 1-ethyl-3-methylimidazolium ion capable of achieving the low viscosity of the ionic liquid.

As the supporting electrolyte to be used for the second nonaqueous electrolyte, $Li[(CF_3SO_2)_2N]$ is preferred as described above. As the organic solvent, organic solvents having a high boiling point such as EC/PC, EC/γBL, EC/PC/γBL, and PC/γBL are preferred. Since the solid electrolyte layer containing an organic polymer is flexible, it may be deformed if the vapor pressure of the organic solvent is increased under high temperature conditions. Therefore, the organic solvent having a high boiling point is preferred. Among them, the mixed solvent containing EC and PC is preferred because of being excellent in stability.

The supporting electrolyte to be used for the solid electrolyte layer containing an organic polymer is preferably $Li[(CF_3SO_2)_2N]$ as described above. As the organic polymer, the polyethylene oxide-containing polymer is preferred. This is because an ethyleneoxide structure of a main chain of polyethylene oxide exhibits lithium ion conductivity.

When the solid electrolyte layer containing an organic polymer is used, the most preferable combination is a combination in which the first nonaqueous electrolyte contains $[(CF_3SO_2)_2N]$-1-ethyl-3-methyimidazolium $[(CF_3SO_2)_2N]$, the solid electrolyte layer contains $Li[(CF_3SO_2)_2N]$-polyethylene oxide, and the second nonaqueous electrolyte contains $Li[(CF_3SO_2)_2N]$-EC/PC. According to the combination, a low-viscosity and hydrophobic ionic liquid is used and the decomposition reaction of the electrolyte when contacting with air or water can be suppressed. Thus, the durability and large current discharging characteristics of the air battery can be improved.

When the solid electrolyte layer containing the oxide and/or sulfide is used, the supporting electrolytes included in the first and second nonaqueous electrolytes do not need to be the same. This is because, since the solid electrolyte layer containing the oxide and/or sulfide does not include the supporting electrolyte, an exchange with the supporting electrolyte included in the first and second nonaqueous electrolytes is not caused.

As the ionic liquid to be used for the first nonaqueous electrolyte, an ionic liquid which has high lithium ion conductivity and is hydrophobic is preferred. As the anion, an anion obtained by substituting a part of fluorine element of $PF_6^-$, $BF_4^-$ or an anion having a sulfonylimide group by a fluoro alkyl group is preferred. Among them, $BF_3(CF_3)^-$ or $[(CF_3SO_2)_2N]^-$, particularly $[(CF_3SO_2)_2N]^-$ is preferred.

Preferable examples of the cations include N-butyl-N,N,N-trimethylammonium ion, N-ethyl-N,N-dimethyl-N-propylammonium ion, N-butyl-N-ethyl-N,N-dimethylammonium ion, N-butyl-N,N-dimethyl-N-propylammonium ion, N-propyl-N-methylpyrrolidinium ion, N-butyl-N-methylpyrrolidinium ion, 1-ethyl-3-methylimidazolium ion, 1-butyl-3-methylimidazolium ion, 1-ethyl-2,3-dimethylimidazolium ion, and 1-ethyl-3,4-dimethylimidazolium ion. Particularly, N-propyl-N-methylpyrrolidinium ion, N-butyl-N-methylpyrrolidinium ion, and 1-ethyl-3-methylimidazolium ion are preferred. The most preferred one is 1-ethyl 3 methylimidazolium ion capable of achieving the low viscosity of the ionic liquid.

As the organic solvent to be used for the second nonaqueous electrolyte, organic solvents having excellent carbon dioxide solubility, such as EC/PC, EC/γBL, EC/PC/

γBL, and PC/γBL are preferred. Since the solid electrolyte layer containing the oxide and/or sulfide is an inorganic electrolyte layer, it is rigid. If a gas such as carbon dioxide is generated by decomposition of the nonaqueous electrolyte at the negative electrode and the volume is expanded, the electrolyte layer may be broken. Thus, an organic solvent having a high solubility to carbon dioxide is preferred. Among them, EC/γBL and EC/PC/γBL are preferred because of being excellent carbon dioxide solubility and reduction-resistant properties. It is preferable that the supporting electrolyte is excellent in lithium ion conductivity. Specifically, $LiPF_6$ and $LiBF_4$ are preferred. Particularly, $LiBF_4$ is preferred because of the excellent stability.

Of the oxide and sulfide, more preferred one is the solid electrolyte layer containing the sulfide excellent in lithium ion conductivity. Sulfide glasses are more preferred. Specific examples of the sulfide glasses include $Li_3PS_4$, $Li_4SiS_4$, $LiGeS_4$—$Li_3PS_4$, and $Li_2S$—$SiS_2$ systems, $SiS_2$—$P_2S_5$ system, and $Li_2S$—$B_2S_3$ system. Among them, $Li_2S$—$SiS_2$—$Li_4SiO_4$ system and $Li_2S$—$SiS_2$—$Li_3PO_4$ system are preferred because of high electrical conductivity and excellent reduction-resistant properties.

Thus, when the solid electrolyte layer containing the oxide and/or sulfide is used, the most preferable combination is a combination in which the first nonaqueous electrolyte contains $Li[(CF_3SO_2)_2N]$-1-ethyl-3-methylimidazolium $[(CF_3SO_2)_2N]$, the solid electrolyte layer contains $Li_2S$—$SiS_2$—$Li_3PO_4$ system, and the second nonaqueous electrolyte contains $LiBF_4$-EC/PC/γBL. According to the combination, a low-viscosity and hydrophobic ionic liquid is used and the decomposition reaction of the first nonaqueous electrolyte when contacting with air or water can be suppressed. Thus, the durability and large current discharging characteristics of the air battery can be improved.

Subsequently, the positive electrode, the negative electrode, and the case will be described.

The positive electrode includes a positive electrode current collector and a positive electrode layer supported by the positive electrode current collector.

As the positive electrode current collector, it is preferable to use a conductive substrate having a through hole, such as a mesh, a punched metal or an expanded metal, in order to rapidly diffuse oxygen. Examples of the material of the conductive substrate include stainless steel, nickel, aluminium, iron, and titanium. The surface of the current collector may be covered with an oxidation-resistant metal or alloy in order to suppress oxidation.

The positive electrode layer can be formed, for example, by mixing a carbonaceous material with a binder, pressing the mixture into a film form to form a film, and drying the film. Alternatively, it can be formed, for example, by mixing a carbonaceous material with a binder in a solvent, applying the mixture to a current collector, and drying and pressing the collector.

Examples of the carbonaceous material include ketjen black, acetylene black, carbon black, furnace black, activated carbon, activated carbon fiber, and charcoal. The efficiency of the oxygen reduction reaction can be improved by attaching particles having a function to reduce the oxygen evolution overvoltage, such as cobalt phthalocyanine, to the surface of the carbonaceous materials. Further, the conductivity of the positive electrode layer can be improved by adding a highly conductive carbonaceous material such as acetylene black to the carbonaceous materials.

The binder may be added to the positive electrode layer in order to maintain the layer shape of the layer containing the carbonaceous materials and attach the carbonaceous materials to the current collector. Usable examples of the binder include polytetrafluoroethylene (PTFE), polyvinylidene fluoride (PVdF), ethylene-propylene-butadiene rubber (EPBR), and styrene-butadiene rubber (SBR).

As for the blending ratio of the carbonaceous material and binder in the positive electrode layer, it is preferable that the content of the carbonaceous material is from 70 to 98% by weight and the content of the binder is from 2 to 30% by weight.

The negative electrode includes a negative electrode current collector and a negative electrode active material-containing layer supported by the negative electrode current collector.

As the negative electrode active material, for example, a material for absorbing and releasing lithium ions can be used.

The material for absorbing and releasing lithium ions is not particularly limited. Materials which can be used for lithium ion batteries or lithium batteries can be used. Among them, at least one material selected from the group consisting of a metal oxide, a metal sulfide, a metal nitride, a lithium metal, a lithium alloy, a lithium composite oxide and a carbonaceous material capable of absorbing and releasing lithium ions is preferably used as the negative electrode active material.

Examples of the carbonaceous material capable of absorbing and releasing lithium ions include graphite materials or carbonaceous materials such as graphite, coke, carbon fiber, and spherical carbon, or graphite materials or carbonaceous materials obtained by subjecting thermosetting resin, isotropic pitch, mesophase pitch, mesophase pitch carbon fiber or mesophase microbeads to heat treatment at 500 to 3000° C.

Examples of the metal oxide include tin oxide, silicon oxide, lithium titanium oxide, niobium oxide, and tungsten oxide.

Examples of the metal sulfide include tin sulfide and titanium sulfide.

Examples of the metal nitride include lithium cobalt nitride, lithium iron nitride, and lithium manganese nitride.

Examples of the lithium alloy include lithium aluminium alloy, lithium tin alloy, lithium lead alloy, and lithium silicon alloy.

As the negative electrode current collector, for example, a conductive substrate having a through hole or a nonporous conductive substrate can be used. These conductive substrates can be formed of, for example, copper, stainless steel, or nickel. As the conductive substrate having a porous structure, a mesh, a punched metal, and an expanded metal can be used.

Alternatively, a negative electrode active material-containing layer held by a metallic foil and producing holes in the metallic foil can be used as the conductive substrate having a porous structure.

A negative electrode which contains a negative electrode active material such as a carbonaceous material can be produced by kneading, for example, a negative electrode active material and a binder in the presence of a solvent, applying the obtained slurry to a current collector, drying it, and a one-step or multistep (twice to five times) pressing at a desired pressure.

Examples of the binder include polytetrafluoroethylene (PTFE), polyvinylidene fluoride (PVdF), ethylene-propylene-butadiene rubber (EPBR), styrene-butadiene rubber (SBR), and carboxymethylcellulose (CMC).

As for the blending ratio of the carbonaceous material and binder, it is preferable that the content of the carbonaceous material is from 80 to 98% by weight and the content of the binder is from 2 to 20% by weight.

If metal materials such as a lithium metal and a lithium alloy are used as negative electrode active material, it is possible to process these metal materials into sheet shapes. Thus; the negative electrode active material-containing layer can be formed without using the binder. The negative electrode active material-containing layer formed of these metal materials can be directly connected to a negative electrode terminal.

The case can be formed of, for example, a metal plate and a sheet containing a resin layer.

The metal plate can be formed of, for example, iron, stainless steel, and aluminium.

It is preferable that the sheet contains a metal layer and a resin layer which covers the metal layer. The metal layer is preferably formed of aluminum foil. On the other hand, the resin layer can be formed of thermoplastic resins such as polyethylene and polypropylene. The resin layer can be configured to have a single or multilayer structure.

FIG. 1 shows an example of the air battery according to the embodiment. A nonaqueous electrolyte air battery is shown in FIG. 1. The nonaqueous electrolyte air battery comprises a case 1 which is formed of a laminate film having an inner surface formed of a thermoplastic resin layer. The case 1 is formed of, for example, a laminate film formed by heat-sealing three sides in which the inner surfaces are superimposed. A solid electrolyte layer 2 is disposed in the case 1 and three sides thereof are sandwiched among laminate films. The space in the case 1 is divided into two spaces at the boundary of the solid electrolyte layer 2. A positive electrode 3 is housed in one of the spaces (the upper side of FIG. 1), called "a first space 4". A negative electrode 5 is housed in the other space, called "a second space 6". A hole (e.g. air hole) 7 is opened so as to communicated with the first space 4 on the wall surface of the case 1. The air hole 7 is configured to supply oxygen to the positive electrode 3.

The positive electrode 3 includes a positive electrode layer 8 to be in contact with one surface of the solid electrolyte layer 2 and a positive electrode current collector 9 in which the positive electrode layer 8 is formed and which is formed of, for example, a porous conductive substrate. One end of a positive electrode terminal 10 is electrically connected to the positive electrode current collector 9. The other end is externally extended through the heat-sealed portions of the case 1 (portions in which laminate films are heat-sealed). An air diffusion layer 11 is arranged on the positive electrode current; collector 9. The air diffusion layer 11 is not particularly limited as long as it can supply the air taken from the air hole 7 to the positive electrode 3. Examples thereof include a porous film containing fluororesins such as polyethylene, polypropylene, and PTFE; a nonwoven fabric formed of synthetic resins such as polypropylene and PTFE; and a glass fiber nonwoven fabric. A first nonaqueous electrolyte (not shown) is held by the positive electrode 3 and is housed in the first space 4, if necessary.

A negative electrode 5 includes a negative electrode active material-containing layer 12 to be contact with the surface of the opposite side of the solid electrolyte layer 2 and a negative electrode current collector 13 in which the negative electrode active material-containing layer 12 is formed and which is formed of, for example, a porous conductive substrate. One end of a negative electrode terminal 14 is electrically connected to the negative electrode current collector 13. The other end is externally extended through the heat-sealed portions of the case 1 (portions in which laminate films are heat-sealed). The extending direction of the negative electrode terminal 14 is opposite to the extending direction of the positive electrode terminal 10. A second nonaqueous electrolyte (not shown) is held by the negative electrode 5 and is housed in the second space 6, if necessary.

A sealing tape 15 which seals the air hole 7 is removably arranged on the outer surface of the case 1. The air can be supplied to the positive electrode layer 8 by detaching the sealing tape 15 when the battery is used.

As illustrated in FIG. 1, when the first space 4 in the case 1 and the second space 6 are separated by the solid electrolyte layer 2, the effect for preventing the diffusion of the first nonaqueous electrolyte to the negative electrode as well as the diffusion of the second nonaqueous electrolyte to the positive electrode is improved. Accordingly, it is expected that the durability and high current charge and discharge characteristics of the air battery are further improved.

EXAMPLES

Hereinafter, examples will be described in detail with reference to the drawings.

Example 1

90% by weight of ketjen black and 10% by weight of polytetrafluoroethylene were dry-blended and the mixture was pressed to obtain a film-like positive electrode layer having a size of 20 mm in length and width and 200 μm in thickness. The positive electrode layer was compression-bonded to a stainless steel mesh, which was a positive electrode current collector, to produce a positive electrode. The end of a positive electrode terminal was connected to a portion where the positive electrode current collector of the obtained positive electrode was exposed.

A metallic lithium foil was bonded to a nickel mesh by applying pressure and a negative electrode was obtained. In this regard, the end of the negative electrode terminal is connected to the nickel mesh. An air diffusion layer formed by stacking a polypropylene nonwoven fabric and a porous PTFE film and a porous polypropylene film were prepared.

A solid electrolyte layer was prepared by molding a sulfide glass of $Li_2S$—$SiS_2$—$Li_3PO_4$ so as to have a thickness of 100 μm.

A first nonaqueous electrolyte in liquid form was prepared by dissolving a supporting electrolyte of bistrifluoromethanesulfonyl amidolithium ($Li[(CF_3SO_2)_2N]$) in a hydrophobic ionic liquid of 1-ethyl-3-methylimidazolium-bis-trifluoromethanesulfonyl amide at a ratio of 0.8 mol/L.

A second nonaqueous electrolyte in liquid form was prepared by dissolving a supporting electrolyte of $LiBF_4$ at a ratio of 1.5 mol/L in a solvent obtained by mixing ethylene carbonate (EC), propylene carbonate (PC), and γ-butyrolactone (γBL) at a volume ratio of 1:1:4.

The negative electrode, the porous polypropylene film, the solid electrolyte layer, the positive electrode, and the air diffusion layer were sequentially stacked, thereby obtaining a laminate. In the air diffusion layer, the polypropylene nonwoven fabric side was located at the positive electrode side, and the porous PTFE film side was located at the outside. A laminate film having a PE/PP layer on one surface of the aluminum layer and having a PE/PP-PET layer on the other surface was prepared. The softening temperature of the PET layer is lower than that of the PE/PP layer. The adhesive properties are exhibited by heat-pressure bonding the PET layer. The surface having the PET layer is an inner surface of a case. The laminate was covered with the laminate film so that the surface of the PET layer (thermoplastic resin layer) of the laminate film was located at the inside. When the inner surfaces of the laminate film were superimposed, three sides of the solid electrolyte layer were inserted into them. The air hole formed in the laminate film was arranged on the air diffusion layer. A sealing tape was attached to the air hole to be sealed. The other ends of the positive electrode terminal and the negative electrode terminal were extended from between the laminate films whose inner surfaces were superimposed.

The space between the laminate films which covers the ends of the solid electrolyte layer was heat-sealed except for an injection opening. The first and second spaces were separated by the solid electrolyte layer. Then, the first nonaqueous electrolyte was injected from the injection opening into the first space, and the second nonaqueous electrolyte was injected into the second space. The injection opening was heat-sealed to seal the first and second spaces, thereby obtaining a nonaqueous electrolyte air battery having the structure shown in FIG. 1.

Example 2

A solid electrolyte layer containing an organic polymer was produced by heating polyethylene oxide having an average molecular weight 10,000 at 100° C., dissolving 5% by weight of a supporting electrolyte of $Li[(CF_3SO_2)_2N]$ in polyethylene oxide, casting the mixture on a Teflon plate, and cooling it.

A second nonaqueous electrolyte in liquid form was prepared by dissolving a supporting electrolyte of $Li[(CF_3SO_2)_2N]$ at the ratio of 1.0 mol/L in a solvent obtained by mixing ethylene carbonate and propylene carbonate at a volume ratio of 1:1.

A nonaqueous electrolyte air battery was produced similarly to Example 1 except that the solid electrolyte layer and the second nonaqueous electrolyte were produced in the above manner.

Example 3

A nonaqueous electrolyte air battery was produced similarly to Example 1 except that $Li_2O$—$Al_2O_3$—$TiO_2$—$P_2O_5$ glass was used as the solid electrolyte layer and a porous PP film having a thickness of 25 μm was arranged at the negative electrode side of the solid electrolyte layer.

Example 4

A nonaqueous electrolyte air battery was produced similarly to Example 1 except that $La_{0.5}Li_{0.5}TiO_3$ crystal was used as the solid electrolyte and a porous PP film having a thickness of 25 μm was arranged at the negative electrode side of the solid electrolyte layer.

Example 5

A nonaqueous electrolyte air battery was produced similarly to Example 1 except that $Li_3PS_4$ crystal was used as the solid electrolyte and a porous PP film having a thickness of 25 μm was arranged at the negative electrode side of the solid electrolyte layer.

Example 6

A nonaqueous electrolyte air battery was produced similarly to Example 1 except that a nonaqueous electrolyte obtained by dissolving a supporting electrolyte of bistetrafluoromethanesulfonylamide lithium ($Li[(CF_3SO_2)_2N]$) at a ratio of 0.5 mol/L in a hydrophobic ionic liquid of N-ethyl-N,N-dimethyl-N-propyl ammonium bistrifluoromethane sulfonyl amide was used as the first nonaqueous electrolyte.

Example 7

A nonaqueous electrolyte air battery was produced similarly to Example 1 except that a nonaqueous electrolyte obtained by dissolving a supporting electrolyte of bistetrafluoromethanesulfonylamide lithium ($Li[(CF_3SO_2)_2N]$) at a ratio of 1 mol/L in a hydrophobic ionic liquid of triethyl (methoxyethyl)phosphonium bis trifluoromethane sulfonyl amide was used as the first nonaqueous electrolyte.

Example 8

A nonaqueous electrolyte air battery was produced similarly to Example 1 except that a nonaqueous electrolyte obtained by dissolving a supporting electrolyte of $LiBF_4$ at a ratio of 1 mol/L in a solvent obtained by mixing ethylene carbonate, propylene carbonate, propionitrile, and butyl ether at a ratio of 1:1:1:1 was used as the second nonaqueous electrolyte.

Comparative Example 1

A nonaqueous electrolyte air battery was produced similarly to Example 1 except that a nonaqueous electrolyte obtained by dissolving a supporting electrolyte of bistrifluoromethanesulfonylamide lithium ($Li[(CF_3SO_2)_2N]$) at a ratio of 0.8 mol/L in 1-ethyl-3-methylimidazolium bis trifluoromethanesulfonyl amide was used as the first and second nonaqueous electrolytes.

Comparative Example 2

A nonaqueous electrolyte air battery was produced similarly to Example 1 except that a nonaqueous electrolyte obtained by dissolving a supporting electrolyte of $LiBF_4$ at a ratio of 1.5 mol/L in a solvent obtained by mixing ethylene carbonate, propylene carbonate, and γ-butyrolactone at a volume ratio of 1:1:4 was used as the first and second nonaqueous electrolytes.

Comparative Example 3

A first solution was prepared by dissolving an electrolyte of bistrifluoromethanesulfonylamide lithium ($Li[(CF_3SO_2)_2N]$) at a ratio of 0.8 mol/L in 1-ethyl-3-methylimidazolum bis trifluoromethanesulfonyl amide. A second solution was prepared by dissolving an electrolyte of $LiBF_4$ at a ratio of 1.5 mol/L in a solvent obtained by mixing ethylene carbonate, propylene carbonate, and γ-butyrolactone at a volume ratio of 1:1:4. A nonaqueous electrolyte air battery was produced similarly to Example 1 except that a mixture prepared by mixing the first solution and the second solution at a volume ratio of 1:1 was used as the first and second nonaqueous electrolytes.

The discharge characteristics of the produced air battery were measured in a constant temperature and humidity chamber at a temperature of 45° C. and a humidity of 65% under the following conditions. In Test 1, the discharge capacity (mAh/g) per positive electrode carbon weight when discharging up to 2.0 V at a current of 0.04 mA was measured. In Test 2, the discharge capacity (mAh/g) per positive electrode carbon weight when discharging up to 2.0 V at a current of 0.4 mA was measured. In Test 3, the cycle number when the discharge capacity was decreased to 80% of the initial capacity in performing a charge/discharge cycle of discharging up to 2.0 V at a current of 0.4 mA and charging up to 4.0 V at a current of 0.4 mA was measured. The results of Tests 1 to 3 are shown in Table 1 below.

TABLE 1

|  | Test 1 (mAh/g) | Test 2 (mAh/g) | Test 3 (cycle number) |
| --- | --- | --- | --- |
| Example 1 | 2,400 | 2,000 | 160 |
| Example 2 | 2,200 | 1,800 | 130 |
| Example 3 | 2,400 | 2,000 | 180 |
| Example 4 | 2,400 | 2,000 | 170 |
| Example 5 | 2,400 | 2,000 | 180 |
| Example 6 | 2,000 | 1,500 | 210 |
| Example 7 | 2,000 | 1,400 | 220 |
| Example 8 | 2,400 | 2,200 | 120 |
| Comparative Example 1 | 1,500 | 1,200 | 95 |
| Comparative Example 2 | 400 | 2,200 | 45 |
| Comparative Example 3 | 500 | 1,600 | 50 |

In the air batteries in Table 1 and Examples 1 to 8, the discharge capacity at 0.04 mA and the discharge capacity at 0.4 mA were high as compared with the batteries of Comparative Examples 1 to 3 and were excellent in large-current-discharging characteristics and cycle characteristics to be used as an indicator of durability.

In the battery of Comparative Example 1, the discharge capacity at 0.04 mA and the discharge capacity at 0.4 mA were low as compared with those of Examples 1 to 8. When the batteries after Tests 1 to 3 were disassembled, the second nonaqueous electrolyte turned yellow and the surface of the negative electrode turned yellow brown. This is considered because the ionic liquid was reduced and decomposed at a negative electrode potential and thus battery characteristics were lowered.

The batteries of Comparative Examples 2 and 3 were equal in the discharge capacity at 0.4 mA to the examples. However, the batteries were significantly inferior in the discharge capacity at 0.04 mA and cycle characteristics to the examples. Accordingly, it cannot be said that the batteries have large-current-discharging characteristics and durability. In the batteries of Comparative Examples 2 and 3, when the batteries after Test 1 and Test 3 were disassembled, the amount of the first nonaqueous electrolyte was decreased in both cases. Particularly, in Comparative Example 2, the solid was precipitated. This is considered because when battery was used over a long period of time, for example, low electric current discharge or repetition of charge and discharge, the organic solvent included in the first nonaqueous electrolyte was volatilized from the air hole and the battery characteristics were reduced.

There can be provided an air battery which is excellent in durability, can be charged, and has improved high current charge and discharge characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may he made without departing from the spirit of the inventions. The accompanying claims and their equivalents are intended to cover such forms or modifications as would fall within the scope and spirit of the inventions.

What is claimed is:

1. An air battery comprising:
a case which is formed of a laminate film having an inner surface formed of a thermoplastic resin layer;
a positive electrode provided in the case and comprising a positive electrode current collector;
a positive electrode terminal electrically connected to the positive electrode current collector;
a negative electrode provided in the case and comprising a negative electrode current collector;
a negative electrode terminal electrically connected to the negative electrode current collector;
a first nonaqueous liquid electrolyte which is permeated into the positive electrode and which consists of a hydrophobic ionic liquid and an electrolyte dissolved in the hydrophobic ionic liquid;
a second nonaqueous electrolyte which is permeated into the negative electrode and comprises an organic solvent and an electrolyte dissolved in the organic solvent;
a solid electrolyte layer which is provided between the positive electrode and the negative electrode and has lithium ion conductivity; and
a hole which is provided in the case and supplies oxygen to the positive electrode,
wherein the solid electrolyte layer has no through holes and prevents mixing of the first nonaqueous liquid electrolyte and the second nonaqueous electrolyte, and
wherein end portions of the solid electrolyte layer are sandwiched by the inner surface of the case and adhered to the thermoplastic resin layer of the inner surface of the case so that the positive electrode and the negative electrode are separate from each other by the solid electrolyte layer, and
an end portion of the positive electrode terminal and an end portion of the negative electrode terminal are extended from between the laminate films whose inner surfaces are superimposed.

2. The battery according to claim 1,
wherein the solid electrolyte layer comprises at least one selected from the group consisting of an oxide, a sulfide and an organic polymer, and the at least one is not dissolved and swollen in the first nonaqueous electrolyte and the second nonaqueous electrolyte.

3. The battery according to claim 1,
wherein the solid electrolyte layer comprises at least one selected from the group consisting of oxide glasses, oxide crystals, sulfide glasses, sulfide crystals, and polyethylene oxide-containing polymers.

4. The battery according to claim 3,
wherein the ionic liquid comprises at least one cation selected from the group consisting of ammonium ion, imidazolium ion, and phosphonium ion; and at least one anion selected from the group consisting of $PF_6^-$, $BF_4^-$, $CF_3SO_3^-$, $C_4F_9SO_3^-$, $[B(OOC-COO)_2]^-$, $[(CN)_2N]^-$, $[(CF_3SO_2)_2N]^-$, $[(C_2F_5SO_2)_2N]^-$, and $BF_3(CF_3)^-$.

5. The battery according to claim 1, wherein the organic solvent contains at least one selected from the group consisting of esters, ester carbonates, ethers, and nitriles.

6. The battery according to claim 1, wherein the solid electrolyte layer is nonporous.

7. The battery according to claim 1, wherein the solid electrolyte layer comprises an organic polymer, and the first nonaqueous liquid electrolyte, the second nonaqueous electrolyte and the solid electrolyte layer comprise Li[(CF$_3$SO$_2$)$_2$N].

8. The battery according to claim 1, wherein the first nonaqueous liquid electrolyte comprises [(CF$_3$SO$_2$)$_2$N]$^-$ and 1-ethyl-3-methylimidazolium ion, the solid electrolyte layer comprises Li[(CF$_3$SO$_2$)$_2$N] and polyethylene oxide, and the second nonaqueous electrolyte comprises Li[(CF$_3$SO$_2$)$_2$N], ethylene carbonate and propylene carbonate.

9. The battery according to claim 1, wherein the first nonaqueous liquid electrolyte comprises [(CF$_3$SO$_2$)$_2$N]$^-$ and 1-ethyl-3-methylimidazolium ion, the solid electrolyte layer comprises a Li$_2$S—SiS$_2$—Li$_3$PO$_4$ system sulfide glasses, and the second nonaqueous electrolyte comprises LiBF$_4$, ethylene carbonate, propylene carbonate and γ-butyrolactone.

10. The battery according to claim 1, wherein the positive electrode comprises a carbonaceous material.

11. The battery according to claim 1, wherein the negative electrode comprises at least one material selected from the group consisting of a metal oxide capable of absorbing and releasing lithium ions, a metal sulfide capable of absorbing and releasing lithium ions, a metal nitride capable of absorbing and releasing lithium ions, a lithium metal, a lithium alloy, a lithium composite oxide and a carbonaceous material capable of absorbing and releasing lithium ions.

12. The battery according to claim 1, wherein the first nonaqueous liquid electrolyte is sealed by the solid electrolyte layer such that it cannot reach the negative electrode.

13. The battery according to claim 1, wherein the first nonaqueous liquid electrolyte further comprises a supporting electrolyte dissolved in said hydrophobic ionic liquid.

14. The battery according to claim 1, wherein the ionic liquid comprises at least one cation selected from the group consisting of an ammonium ion represented by formula 2, an imidazolium ion represented by formula 3, and a phosphonium ion represented by formula 4:

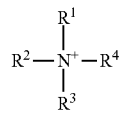

formula 2 wherein R$^1$, R$^2$, R$^3$, and R$^4$ are a substituent selected from the group consisting of a hydrocarbon group, an ester group, an ether group, and a nitrile group and may be the same or different, and the number of carbon atoms contained in the substituent is 8 or less;

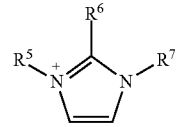

formula 3 wherein R$^5$, R$^6$, and R$^7$ are a substituent selected from the group consisting of a hydrocarbon group, an ester group, an ether group, and a nitrile group and may be the same or different, and the number of carbon atoms contained in the substituent is 8 or less; and

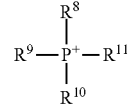

formula 4 wherein R$^8$, R$^9$, R$^{10}$, and R$^{11}$ are a substituent selected from the group consisting of a hydrocarbon group, an ester group, and an ether group and may be the same or different, and the number of carbon atoms contained in the substituent is 8 or less.

15. The battery according to claim 14, wherein the ionic liquid comprises at least one cation represented by formula 2.

16. The battery according to claim 14, wherein the ionic liquid comprises at least one cation represented by formula 3.

17. The battery according to claim 14, wherein the ionic liquid comprises at least one cation represented by formula 4.

* * * * *